United States Patent
Shimokawa et al.

(10) Patent No.: US 8,999,534 B2
(45) Date of Patent: Apr. 7, 2015

(54) LUBRICANT FOR MAGNETIC DISK AND MAGNETIC DISK

(75) Inventors: Koichi Shimokawa, Tokyo (JP); Katsushi Hamakubo, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 382 days.

(21) Appl. No.: 13/386,343

(22) PCT Filed: Jun. 22, 2010

(86) PCT No.: PCT/JP2010/060524
§ 371 (c)(1),
(2), (4) Date: Apr. 2, 2012

(87) PCT Pub. No.: WO2011/010520
PCT Pub. Date: Jan. 27, 2011

(65) Prior Publication Data
US 2012/0276417 A1    Nov. 1, 2012

(30) Foreign Application Priority Data
Jul. 21, 2009   (JP) .................................. 2009-169848

(51) Int. Cl.
| | |
|---|---|
| *G11B 5/66* | (2006.01) |
| *G11B 5/725* | (2006.01) |
| *C10M 105/74* | (2006.01) |
| *C10M 107/38* | (2006.01) |
| *C10M 107/48* | (2006.01) |

(52) U.S. Cl.
CPC ............. *G11B 5/725* (2013.01); *C10M 105/74* (2013.01); *C10M 107/38* (2013.01); *C10M 107/48* (2013.01); *C10M 2213/04* (2013.01); *C10M 2213/043* (2013.01); *C10M 2213/0606* (2013.01); *C10M 2223/08* (2013.01); *C10M 2223/083* (2013.01); *C10N 2220/021* (2013.01); *C10N 2230/06* (2013.01); *C10N 2230/08* (2013.01); *C10N 2240/204* (2013.01); *C10N 2250/14* (2013.01)

(58) Field of Classification Search
USPC .................................................. 508/422, 582
See application file for complete search history.

(56) References Cited

U.S. PATENT DOCUMENTS

| | | | | |
|---|---|---|---|---|
| 6,608,009 | B2 * | 8/2003 | Akada et al. ................... | 508/422 |
| 6,730,403 | B1 * | 5/2004 | Shirai et al. .................. | 428/833.5 |
| 7,252,897 | B2 * | 8/2007 | Shimokawa et al. .......... | 428/833 |
| 7,510,999 | B2 * | 3/2009 | Deng et al. .................... | 508/422 |

(Continued)

FOREIGN PATENT DOCUMENTS

| | | |
|---|---|---|
| JP | 2002-275484 A | 9/2002 |
| JP | 2002/294266 A | 10/2002 |

(Continued)

*Primary Examiner* — Holly Rickman

(57) ABSTRACT

A lubricant for a magnetic disk that is excellent in heat resistance and is suitably used in a magnetic disk to be mounted on a magnetic recording device of a thermally assisted magnetic recording system and a magnetic disk provided with a lubricant layer containing this lubricant. The lubricant for a magnetic disk contains a compound where perfluoropolyether groups each having a perfluoropolyether main chain in its structure and a phosphazene ring at an end are linked to each other through a linking group. The linking group is an aliphatic group or a phosphazene ring. In a magnetic disk having at least a magnetic recording layer, a protective layer, and a lubricant layer on a substrate, the lubricant layer contains the lubricant for a magnetic disk.

3 Claims, 1 Drawing Sheet

(56) References Cited

U.S. PATENT DOCUMENTS

2009/0318664 A1 12/2009 Yang et al.
2010/0028721 A1* 2/2010 Hamakubo et al. ........... 428/848
2011/0143165 A1* 6/2011 Kobayashi et al. ........... 428/800
2012/0219826 A1* 8/2012 Li et al. .......... 428/800
2012/0225217 A1* 9/2012 Itoh et al. ............ 427/558
2012/0251843 A1* 10/2012 Yan et al. ............ 428/800

FOREIGN PATENT DOCUMENTS

JP  2010-6810 A  1/2010
WO  WO 01/21630 A1  3/2001

* cited by examiner

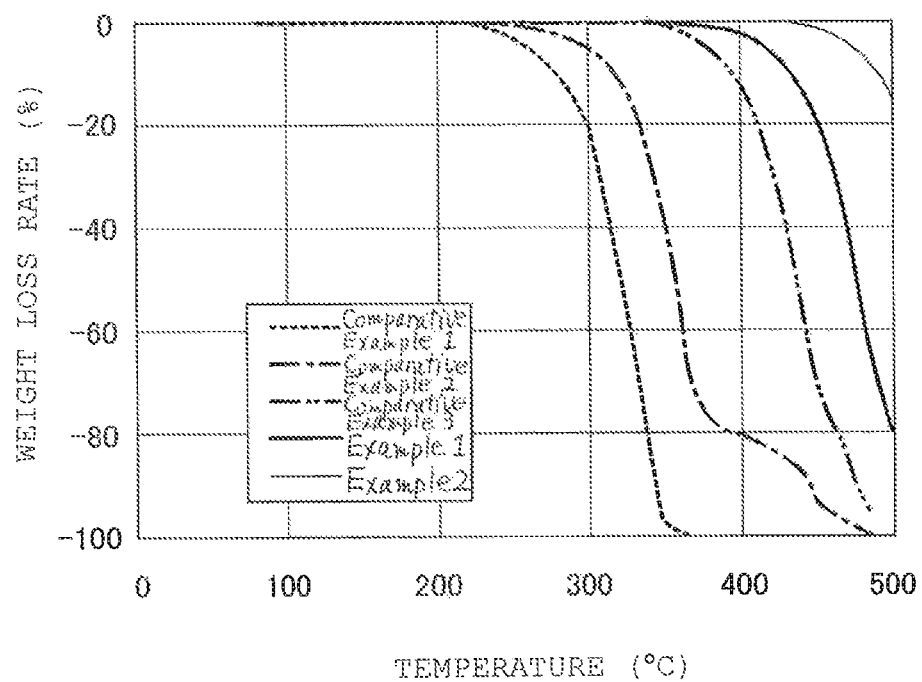

LUBRICANT FOR MAGNETIC DISK AND MAGNETIC DISK

CROSS REFERENCE TO RELATED APPLICATIONS

This application is a National Stage of International Application No. PCT/JP2010/060524 filed Jun. 22, 2010, claiming priority based on Japanese Patent Application No. 2009-169848 filed Jul. 21, 2009 the contents of all of which are incorporated herein by reference in their entirety.

TECHNICAL FIELD

The present invention relates to a lubricant for a magnetic disk that is suitably used in a magnetic disk to be mounted on a magnetic recording device of a thermally assisted magnetic recording system.

BACKGROUND ART

With an increase in capacity for information processing in recent years, various information recording technologies have been developed. Particularly, the surface recording density of a magnetic recording device such as a hard-disk drive using magnetic recording technology is continuing to increase at an annual rate of approximately 100%. Recently, an information recording capacity exceeding 250 GB per disk has been required in a magnetic disk having a diameter of 2.5 inches used in, for example, a hard-disk drive. In order to satisfy such a requirement, it is required to realize an information recording density exceeding 400 Gbits per square inch. In order to achieve a high recording density in a magnetic disk used in, for example, a hard-disk drive, it has been necessary to refine magnetic crystal grains constituting a magnetic recording layer for recording information signals and also to reduce the thickness of the magnetic recording layer. However, in the case of a conventionally commercialized magnetic disk of an in-plane magnetic recording system (also referred to as longitudinal magnetic recording system or horizontal magnetic recording system), as a result of the advance in refinement of magnetic crystal grains, there has arisen a thermal fluctuation phenomenon where the thermal stability of a recorded signal is degraded due to a superparamagnetism phenomenon to lose the recorded signal, and this has been a hindrance factor for an increase in recording density of the magnetic disk.

As one means for solving this hindrance factor, a magnetic recording medium for a perpendicular magnetic recording system is known. In the case of the perpendicular magnetic recording system, unlike the case of the in-plane magnetic recording system, the easy magnetization axis of a magnetic recording layer is adjusted so as to be oriented in a direction perpendicular to the surface of a substrate. As compared with the in-plane magnetic recording system, the perpendicular magnetic recording system can suppress the thermal fluctuation phenomenon and is therefore suitable for increasing the recording density.

However, the requirement for an increase in information recording capacity increasingly becomes high, and, accordingly, there is a demand for appearance of a recording system that can achieve an ultra-high recording density that exceeds the information recording density of the perpendicular magnetic recording system.

As one method therefor, thermally assisted magnetic recording is drawing attention. This thermally assisted magnetic recording is a sort of a recording system where a magnetic recording system and an optical recording system are combined. It magnetically records by giving heat energy to a recording medium through light irradiation and then stores by enlarging the coercive force of the recording medium by rapid cooling. Reproduction is performed magnetically at room temperature. According to this thermally assisted magnetic recording system, record-reproduction can be performed against a medium having high coercive force and excellent thermal fluctuation resistance, which does not allow the conventional magnetic recording system to record. Consequently, it is possible to refine magnetic crystal grains while maintaining the satisfactory heat stability, and, thereby, it is expected to achieve an ultra-high recording density that exceeds the information recording density of the conventional perpendicular magnetic recording system and improve the S/N ratio in high density recording.

Incidentally, the magnetic disk used in the current magnetic recording system has a protective layer and a lubricant layer on a magnetic recording layer formed on a substrate in order to ensure durability and reliability of the magnetic disk. In particular, the lubricant layer disposed on the outermost surface is required to have various characteristics such as long-term stability, chemical resistance, friction property, and heat-resistant property.

Also in the current magnetic disk, it is a challenge to provide a magnetic disk having a lubricant layer excellent in heat resistance to prevent fly-stiction failure or corrosion failure even at an extremely low flying height of 10 nm or less or a magnetic disk having a lubricant layer with good temperature characteristics and can exert a stable action over a wide temperature range. In particular, an improvement in heat resistance property of a lubricant used in the lubricant layer is an urgent issue.

For example, Japanese Unexamined Patent Application Publication No. 2000-311332 (Patent Literature 1) discloses a magnetic recording medium applied with a lubricant including a combination of a circular triphosphazene lubricant and perfluoropolyether lubricant to improve lubricant properties and CSS properties without decomposing lubricant even if using a low flying-height magnetic head. Japanese Unexamined Patent Application Publication No. 2003-132520 (Patent Literature 2) discloses a magnetic disk medium applied with a phosphazene lubricant having a phosphazene ring on at least one end of a perfluoropolyether main chain. Furthermore, Japanese Unexamined Patent Application Publication No. 2004-152460 (Patent Literature 3) discloses a magnetic disk having a highly adhesive lubricant layer that stably acts even at ultra-low flying height and can inhibit migration by using a lubricant including a combination of a perfluoropolyether compound having a phosphazene ring in an end group and a perfluoropolyether compound having a hydroxyl group in an end group.

CITATION LIST

Patent Literature

Patent Literature 1: Japanese Unexamined Patent Application Publication No. 2000-311332
Patent Literature 2: Japanese Unexamined Patent Application Publication No. 2003-132520
Patent Literature 3: Japanese Unexamined Patent Application Publication No. 2004-152460

SUMMARY OF INVENTION

Technical Problem

It is possible to raise the heatproof temperature of a lubricant to, for example, up to about 300° C. by using a material having heat resistance, such as the conventional phosphazene compound disclosed in the above-mentioned patent literatures, and it is possible to improve the heat resistance required to the lubricant layer of the current magnetic disk to be higher than ever.

However, in the case of a thermally assisted magnetic recording system, in particular, in an optical dominant recording system capable of high-density recording, since a steep change in magnetic property is used, recording is performed at around Curie temperature, and, therefore, sharp heating and sharp cooling are repeated between Curie temperature and ordinary temperature. Accordingly, the lubricant used in the lubricant layer of the magnetic disk of the thermally assisted magnetic recording system is required to have heat resistance exceeding that required in the lubricant layer of the current magnetic disk. It is believed that the heatproof temperature of a lubricant in such a thermally assisted magnetic recording system is required to be at least about 600 to 700K (330 to 500° C.). Accordingly, it is required to improve the heat resistance so as to significantly exceed the heat resistance of the conventional lubricant.

Under these circumstances, it is a first object of the present invention to provide a lubricant for a magnetic disk that is excellent in heat resistance, showing a very high heatproof temperature and is suitably used in a magnetic disk to be mounted on a magnetic recording device of a thermally assisted magnetic recording system, and it is a second object of the invention to provide a magnetic disk having a lubricant layer containing such a lubricant and being exceptional in heat resistance.

Solution to Problem

The present inventor has diligently studied and, as a result, has found that the above-described problems can be solved by the following invention, and thus accomplished the present invention.

That is, the present invention includes the following aspects.

(Aspect 1) A lubricant for a magnetic disk contains a compound where perfluoropolyether groups each having a perfluoropolyether main chain in its structure and a phosphazene ring at an end are linked to each other through a linking group.

(Aspect 2) In the lubricant for a magnetic disk according to Aspect 1, the linking group is an aliphatic group.

(Aspect 3) In the lubricant for a magnetic disk according to Aspect 2, the aliphatic group has at least two hydroxyl groups in the structure.

(Aspect 4) In the lubricant for a magnetic disk according to Aspect 1, the linking group is a group consisting of a phosphazene ring.

(Aspect 5) In the lubricant for a magnetic disk according to any one of Aspects 1 to 4, the perfluoropolyether group has a perfluoropolyether main chain represented by $—(CF_2CF_2O)m-(CF_2O)n-$ (wherein m and n are each an integer of 1 or more) in the structure.

(Aspect 6) In the lubricant for a magnetic disk according to any one of Aspects 1 to 5, the compound has a number-average molecular weight (Mn) in the range of 1000 to 10000.

(Aspect 7) A magnetic disk having at least a magnetic recording layer, a protective layer, and a lubricant layer on a substrate, wherein the lubricant layer contains the lubricant for a magnetic disk according to any one of Aspects 1 to 6.

Advantageous Effects of Invention

The present invention can provide a lubricant for a magnetic disk that is excellent in heat resistance showing a very high heatproof temperature and is suitably used in a magnetic disk to be mounted on a magnetic recording device of a thermally assisted magnetic recording system by using a lubricant for a magnetic disk containing a compound where perfluoropolyether groups each having a perfluoropolyether main chain in its structure and a phosphazene ring at an end are linked to each other through a linking group.

Furthermore, the present invention can provide a magnetic disk having exceptional heat resistance and being suitable as a magnetic disk to be mounted on a magnetic recording device of a thermally assisted magnetic recording system by forming a lubricant layer using the above described lubricant for a magnetic disk.

BRIEF DESCRIPTION OF DRAWING

FIG. 1 is a graph showing the results of thermal decomposition characteristics of lubricants in Examples of the present invention and Comparative Examples.

DESCRIPTION OF EMBODIMENTS

The present invention will now be described in detail with reference to embodiments.

A feature of the lubricant for a magnetic disk according to the present invention is to contain a compound (hereinafter, referred to as "lubricant compound of the present invention") where perfluoropolyether groups each having a perfluoropolyether main chain in its structure and a phosphazene ring at an end are linked to each other through a linking group.

As the lubricant compound of the present invention, specifically, lubricant compounds according to the following embodiments 1 to 3 described below are preferred examples. However, it is apparent that the lubricant compound of the present invention is not limited to those according to the following embodiments 1 to 3.

Embodiment 1

The lubricant compound according to this embodiment is a compound where perfluoropolyether groups each having a perfluoropolyether main chain in its structure and a phosphazene ring at an end are linked to each other through a divalent aliphatic group.

The divalent aliphatic group is, for example, a group having a group represented by $—(CR_1R_2)—$ in the main chain, and, preferably, an oxygen atom further intervenes in the main chain. Here, $R_1$ and $R_2$ are independently a hydrogen atom or a hydroxyl group. Furthermore, the aliphatic group preferably has at least two hydroxyl groups in the structure. The interaction between the hydroxyl groups and a carbon protective layer can enhance the adhesion between the resulting lubricant layer and the protective layer.

The perfluoropolyether group has a perfluoropolyether main chain represented by, for example, $—(CF_2CF_2O)m-(CF_2O)n-$ (wherein m and n are each an integer of 1 or more) in its structure and a phosphazene ring at an end. The phosphazene ring may have an appropriate substituent. Preferred examples of the perfluoropolyether group include groups represented by the following Formula (I):

Formula (I)

[Formula 1]

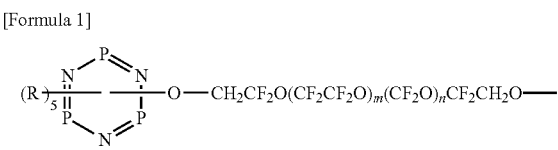

wherein m and n are each an integer of 1 or more; and R represents a substituent of the phosphazene ring and is, for example, a phenoxy group or a phenyl group.

As a method for producing the lubricant compound according to this embodiment, preferred examples include a method by reacting two equivalents of a perfluoropolyether compound having a perfluoropolyether main chain in its molecule and a phosphazene ring at an end with one equivalent of an aliphatic compound having a structure that can react with the perfluoropolyether compound.

Preferred examples of the aliphatic compound include epoxy compounds each having an epoxide structure at an end. By using such a compound, the lubricant compound according to this embodiment can be obtained with high purity and high yield. Specific examples of such an epoxy compound include, but not limited to, the following.

[Formula 2]

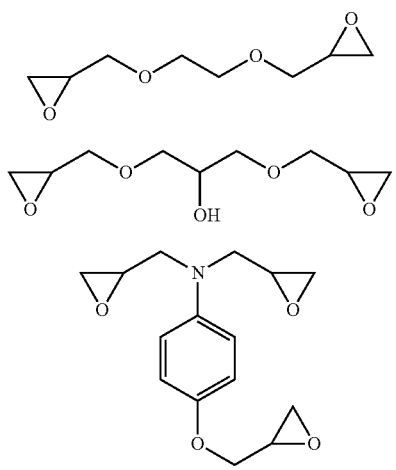

(a)

(b)

(c)

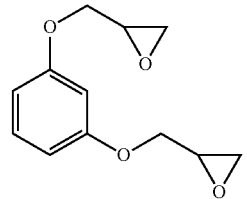

(d)

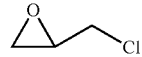

(e)

Furthermore, examples of the perfluoropolyether compound include perfluoropolyether compounds each having a phosphazene ring at one end of the molecule and a hydroxyl group at another end and are represented by the following Formula (II):

Formula (II)

[Formula 3]

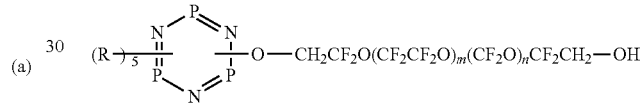

wherein m and n are each an integer of 1 or more; and R represents a substituent of the phosphazene ring and is, for example, a phenoxy group or a phenyl group.

That is, under basic conditions, a perfluoropolyether compound having a hydroxyl group at an end is reacted with a base to obtain an alkoxide, and this alkoxide is subjected to a nucleophilic ring-opening reaction with an aliphatic compound having an epoxide structure at an end to obtain a dimer compound in which the perfluoropolyether compounds are linked to each other through a linking group formed from the aliphatic compound.

Typical example compound of the lubricant compound according to this embodiment are shown as follows, but the present invention is not limited to these compounds.

[Formula 4]

Example compound A

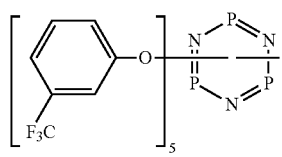

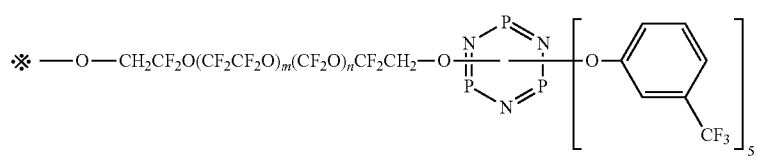

The example compound shown above is obtained by reacting two equivalents of the perfluoropolyether compound represented by Formula (II) and one equivalent of the exemplified compound (b) of the diepoxy compound.

Furthermore, the lubricant compound according to this embodiment may be a compound having, for example, a structure having a perfluoropolyether main chain represented by —(CF$_2$CF$_2$CF$_2$O)m- or —(CF(CF$_3$)CF$_2$O)m- (wherein m is an integer of 1 or more) instead of the perfluoropolyether main chain represented by —(CF$_2$CF$_2$O)m-(CF$_2$O)n- (wherein m and n are each an integer of 1 or more) in the structure of the perfluoropolyether group.

Embodiment 2

The lubricant compound according to this embodiment is a compound where perfluoropolyether groups each having a perfluoropolyether main chain in its structure and a phosphazene ring at an end are linked to each other through a phosphazene ring.

The perfluoropolyether group has a perfluoropolyether main chain represented by, for example, —(CF$_2$CF$_2$O)m-(CF$_2$O)n- (wherein m and n are each an integer of 1 or more) in its structure and a phosphazene ring at an end. Preferred examples of the perfluoropolyether group include groups represented by the above-mentioned Formula (I) as in Embodiment 1.

Typical example compounds of the lubricant compound according to this embodiment are shown as follows, but the present invention is not limited to these compounds.

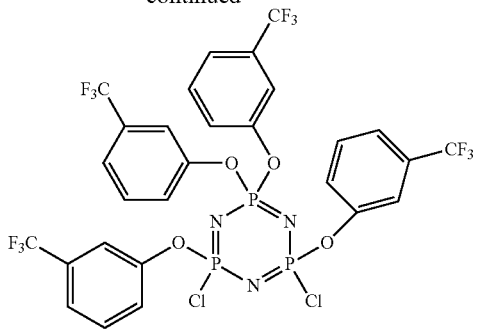

For example, as a linking group moiety, first, according to a method shown in the reaction scheme above, four equivalents of m-trifluoromethyl phenol is reacted with a base and with one equivalent of a phosphonitrilic chloride trimer to prepare cyclophosphazene tetra-substituted with phenoxy. Subsequently, two equivalents of perfluoropolyether compound having a perfluoropolyether main chain in the molecule and a phosphazene ring at an end is reacted with one equivalent of the cyclophosphazene tetra-substituted with phenoxy to give the lubricant compound.

Furthermore, the above-mentioned example compound is a dimer compound in which the perfluoropolyether groups having a perfluoropolyether main chain in its structure and a

[Formula 5]

Example compound B

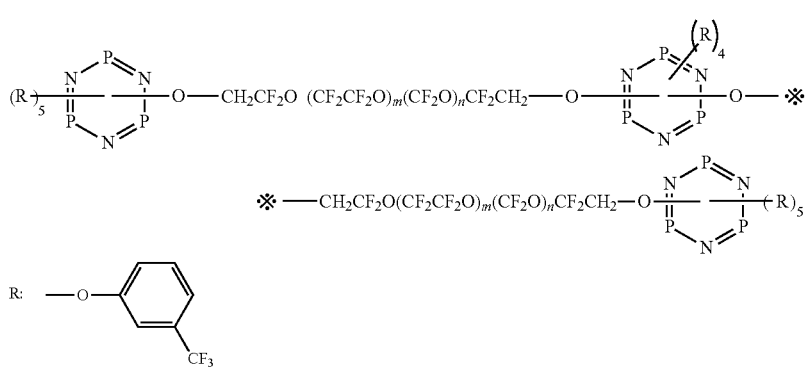

As a method of producing the lubricant compound according to this embodiment, for example, the following method is preferred.

[Formula 6]

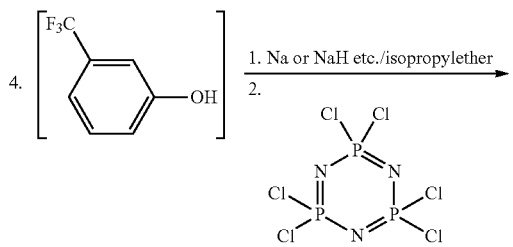

phosphazene ring at an end are linked to each other through a phosphazene ring, but the lubricant compound according to this embodiment is not limited thereto and may be a multimer compound where the perfluoropolyether groups are linked through phosphazene rings to be trimer or more. As a method of producing the multimer compound such as a trimer or more, preferred examples include a method by reacting two equivalents of a perfluoropolyether compound having a perfluoropolyether main chain in its molecule and a hydroxyl group at an end with one equivalent of cyclophosphazene tetra-substituted with phenoxy and reacting one equivalent of the resulting compound and cyclophosphazene penta-substituted with phenoxy to obtain a trimer.

Furthermore, the lubricant compound according to this embodiment may also be a compound with, for example, a structure having a perfluoropolyether main chain represented by —(CF$_2$CF$_2$CF$_2$O)m- or —(CF(CF$_3$)CF$_2$O)m- (wherein m is an integer of 1 or more) instead of the perfluoropolyether main chain represented by —(CF$_2$CF$_2$O)m-(CF$_2$O)n-

(wherein m and n are each an integer of 1 or more) in the structure of the perfluoropolyether group.

Embodiment 3

The lubricant compound according to this embodiment is also a compound where perfluoropolyether groups each having a perfluoropolyether main chain in its structure as in Embodiment 2 and a phosphazene ring at an end are linked to each other through a phosphazene ring, but the feature of the compound according to this embodiment is to have a structure where one phosphazene ring has a plurality of perfluoropolyether groups at the sites of substitution thereof. Incidentally, preferred examples of the perfluoropolyether group include the groups represented by the above-mentioned Formula (I) as in the above-described Embodiment 1.

Typical example compounds of the lubricant compound according to this embodiment are shown as follows, but the present invention is not limited to these compounds.

tective layer. Accordingly, in the present invention, in the perfluoropolyether main chain represented by —(CF$_2$CF$_2$O)m-(CF$_2$O)n- in the structure of the perfluoropolyether group, the value of m+n is 5 to 100, preferably in the range of about 10 to 50.

The molecular weight of the lubricant compound of the present invention is not particularly limited, but the number-average molecular weight (Mn) measured, for example, using nuclear magnetic resonance absorption (NMR) is preferably in the range of 1000 to 10000, more preferably in the range of 1000 to 5000. The lubricant compound of the present invention having a molecular weight within the above-mentioned range can have high heat resistance that is not thermally decomposed in record-reproduction by a thermally assisted magnetic recording system to continue stable record-reproduction without failure and also can have satisfactory temperature characteristics in a broad temperature range.

[Formula 7]

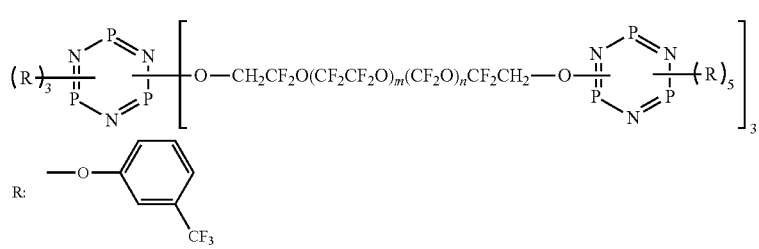

Example compound C

As a method for producing the lubricant compound according to this embodiment, preferred examples include a method by reacting three equivalents of a perfluoropolyether compound having a perfluoropolyether main chain in its molecule and a phosphazene ring at an with and one equivalent of cyclophosphazene tri-substituted with phenoxy.

Furthermore, the lubricant compound according to this embodiment may also be a compound with, for example, a structure having a perfluoropolyether main chain represented by —(CF$_2$CF$_2$CF$_2$O)m- or —(CF(CF$_3$)CF$_2$O)m- (wherein m is an integer of 1 or more) instead of the perfluoropolyether main chain represented by —(CF$_2$CF$_2$O)m-(CF$_2$O)n- (wherein m and n are each an integer of 1 or more) in the structure of the perfluoropolyether group.

The lubricant compound of the present invention has been specifically described with reference to Embodiments 1 to 3, and as described above, the lubricant compound of the present invention has a structure having a perfluoropolyether main chain in its molecule, in addition to a phosphazene ring. By having the perfluoropolyether structure, satisfactory lubricant performance including heat resistance can be obtained as a lubricant for a magnetic disk. The molecular weight can also be adjusted by adjusting the length of the perfluoropolyether main chain within an appropriate range. For example, the length of the perfluoropolyether main chain is increased within an appropriate range to increase the molecular weight. By doing so, a change in viscosity of the lubricant can be reduced even in a broad temperature range to improve the temperature characteristics of the lubricant. The length of the perfluoropolyether main chain is not particularly limited, but if the main chain is too short, the lubricant may easily evaporate or the lubricant performance may be insufficient. On the other hand, a long main chain has a large molecular weight, which contributes to improvement in heat resistance and temperature characteristics, but may reduce adhesion with a pro- In the present invention, the molecular weight dispersity (ratio of weight-average molecular weight (Mw)/number-average molecular weight (Mn)) is preferably adjusted in the range of 1.3 or less by subjecting the lubricant consisting of a lubricant compound of the present invention to molecular weight fractionation using an appropriate method.

In the present invention, the method for molecular weight fractionation is not particularly limited, and, for example, molecular weight fractionation by gel permeation chromatography (GPC) or molecular weight fractionation by supercritical extraction can be employed.

Furthermore, in formation of a lubricant layer using a lubricant for a magnetic disk including the lubricant compound of the present invention, a film as the layer can be formed by application through, for example, dipping in a solution prepared by dissolving the lubricant in an appropriate solvent. As the solvent, for example, a fluorine solvent (e.g., Vertrel XF (trade name) manufactured by Du Pont-Mitsui Fluorochemicals Company, Ltd.) can be preferably used. The method of forming the lubricant layer is not limited to the dipping, and a method such as spin coating, spraying, or paper coating may be used for film formation.

In the present invention, the lubricant layer of the magnetic disk after the film formation is preferably subjected to ultraviolet irradiation in order to further improve the adhesion force of the resulting lubricant layer to the protective layer. By the ultraviolet irradiation, the lubricant compound of the present invention efficiently binds to active spots (adsorption sites) on the protective layer to further improve the adhesion force of the lubricant layer to the protective layer. Since a wavelength region of about 185 nm shows high reaction efficiency against the lubricant compound of the present invention, irradiation with ultraviolet rays containing at least such a wavelength region is preferred. Incidentally, the irradiation time can be arbitrarily adjusted.

In the present invention, the thickness of the lubricant layer is preferably 4 to 18 Å. A thickness less than 4 Å may cause a reduction in lubrication performance as a lubricant layer. A thickness of higher than 18 Å is undesirable from the viewpoint of reducing the thickness of the film.

The protective layer in the present invention can be a carbon protective layer. In particular, an amorphous carbon protective layer is preferred. Such a protective layer has high affinity with the lubricant compound of the present invention to give satisfactory adhesion force.

In the case of using a carbon protective layer in the present invention, the layer can be formed by, for example, DC magnetron sputtering. Alternatively, an amorphous carbon protective layer formed by a plasma CVD method is also preferred. In the present invention, the thickness of the protective layer is preferably 20 to 70 Å. A thickness less than 20 Å may cause a reduction in performance as a protective layer. A thickness exceeding 70 Å is undesirable from the viewpoint of reducing the thickness of the film.

In the present invention, the substrate is preferably a glass substrate. A glass substrate is rigid and is excellent in smoothness, and is therefore suitable for increasing recording density. Examples of the glass substrate include aluminosilicate glass substrates, and chemically-strengthened aluminosilicate glass substrate is particularly preferred.

In the present invention, the substrate preferably has an ultra-smooth main surface having a roughness Rmax of 6 nm or less and Ra of 0.6 nm or less. The surface roughness Rmax and Ra here are based on the definition in JIS B0601.

The magnetic disk of the present invention includes at least a magnetic recording layer, a protective layer, and a lubricant layer on the substrate. In the case of applying to thermally assisted magnetic recording, a high-coercive force magnetic layer that cannot record by a usual magnetic recording system is preferred as the magnetic recording layer. For example, a CoFeTb magnetic layer is excellent in thermal fluctuation resistance and can provide both high coercive force and high reproduction output and is therefore preferred.

In the magnetic disk of the present invention, an underlayer of an appropriate material for improving recording resolution of the magnetic recording layer can be optionally disposed between the substrate and the magnetic recording layer. Furthermore, an adhesion layer may be disposed between the underlayer and the substrate.

EXAMPLES

The present invention will now be described more specifically with reference to Examples.

Example 1

The lubricant compound A exemplified in the above (lubricant compound according to Embodiment 1) was produced by reacting two equivalents of a perfluorodiol compound represented by the above-mentioned Formula (II) with one equivalent of the diepoxy compound (b) exemplified in the above under basic conditions. Specifically, the above-mentioned both compounds were stirred in acetone, and sodium hydroxide was added thereto, followed by reflux. Conditions such as the reaction temperature and time were appropriately determined. The lubricant containing the thus-obtained compound was appropriately subjected to molecular weight fractionation by supercritical extraction to prepare a lubricant having a Mn of 5000 measured by NMR and a molecular weight dispersity of 1.2.

Example 2

Two equivalents of perfluoropolyether compound having a perfluoropolyether main chain in the molecule and a hydroxyl group at an end was reacted with one equivalent of cyclophosphazene tetra-substituted with phenoxy. Subsequently, one equivalent of the resulting compound was reacted with cyclophosphazene penta-substituted with phenoxy to produce the lubricant compound B exemplified in the above (lubricant compound according to Embodiment 2). Conditions such as the reaction temperature and time were appropriately determined. The lubricant containing the thus-obtained compound was appropriately subjected to molecular weight fractionation by supercritical extraction to prepare a lubricant having a Mn of 6000 measured by NMR and a molecular weight dispersity of 1.2.

Comparative Example 1

Fomblin Z-Tetraol (trade name) manufactured by Solvay Solexis SPA was subjected to molecular weight fractionation by supercritical extraction to prepare a lubricant having a Mn of 2500 and a molecular weight dispersity of 1.2.

Comparative Example 2

As a lubricant, phosphazene compound A20H (trade name) having the following structure, manufactured by Moresco Corporation, was used.

[Formula 8]

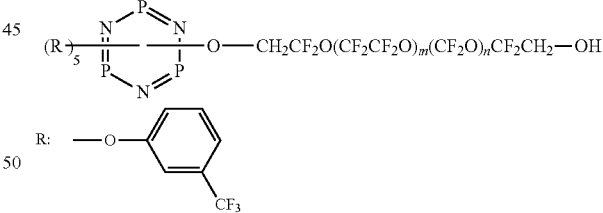

Comparative Example 3

As a lubricant, a lubricant (known compound) having the following structure was used.

[Formula 9]

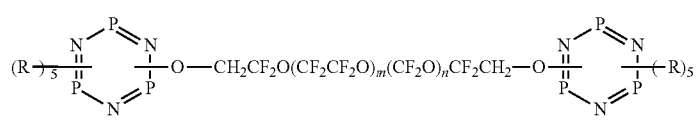

-continued

R: 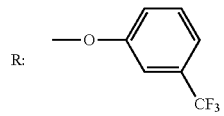

The lubricants of Examples 1 and 2 and Comparative Examples 1 to 3 were evaluated for thermal decomposition characteristics. Specifically, weight loss rate of each lubricant was measured for heating temperatures with a thermogravimetry. The results are collectively shown in FIG. 1. In addition, the values of weight loss rate of each lubricant at 350° C. and 450° C. are collectively shown in the following Table 1.

TABLE 1

|  | Weight loss rate (350° C.) | Weight loss rate (450° C.) |
|---|---|---|
| Example 1 | 0% | −18% |
| Example 2 | 0% | −1.7% |
| Comparative Example 1 | −99% | −100% |
| Comparative Example 2 | −38% | −95% |
| Comparative Example 3 | −1.3% | −73% |

As obvious from the results shown in FIG. 1 and Table 1, the lubricant for a magnetic disk according to the present invention can considerably improve the heat resistance property compared to conventional lubricant and is therefore suitable as a lubricant of a magnetic disk used in a thermally assisted magnetic recording system, which requires the lubricant to have a heatproof temperature exceeding 300° C.

The invention claimed is:

1. A lubricant for a magnetic disk comprising a compound represented by the following Formula (3):

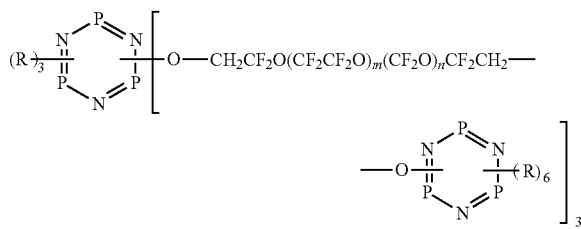

Formula (3)

wherein R represents

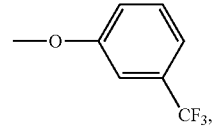

and wherein m and n each represents an integer of 1 or more.

2. The lubricant for a magnetic disk according to claim 1, wherein the compound has a number-average molecular weight (Mn) in the range of 1000 to 10000.

3. A magnetic disk comprising at least a magnetic recording layer, a protective layer, and a lubricant layer on a substrate, wherein
the lubricant layer contains the lubricant for a magnetic disk according to claim 1.

* * * * *